No. 756,126. Patented March 29, 1904.

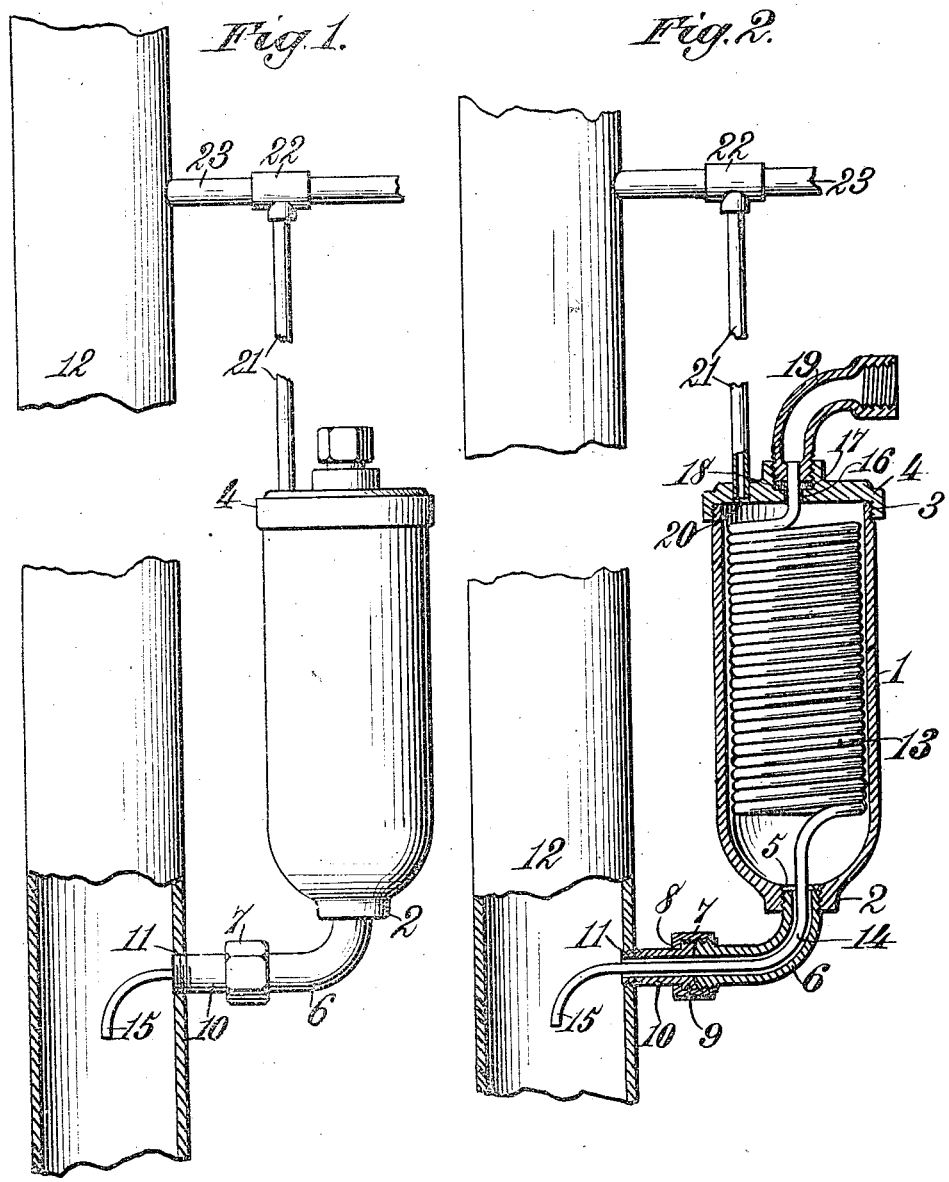

UNITED STATES PATENT OFFICE.

WILLIAM P. MAINGAULT AND JOHN C. GRAHAM, OF MEMPHIS, TENNESSEE.

VAPORIZING DEVICE FOR LUBRICANTS.

SPECIFICATION forming part of Letters Patent No. 756,126, dated March 29, 1904.

Application filed May 18, 1903. Serial No. 158,534. (No model.)

*To all whom it may concern:*

Be it known that we, WILLIAM P. MAINGAULT and JOHN C. GRAHAM, citizens of the United States, residing at Memphis, in the county of Shelby and State of Tennessee, have invented new and useful Improvements in Vaporizing Devices for Lubricants, of which the following is a specification.

This invention relates to an improved vaporizing device for lubricants, and has for its object to provide a simple and efficient device of the character referred to by means of which a lubricant is vaporized or partially vaporized by steam heat and is fed, together with the steam, to the working parts of the machinery designed to be operated by the steam-pressure—such as an engine, for example.

To these ends our invention consists in the features and in the construction, combination, and arrangement of parts hereinafter described, and particularly pointed out in the claims following the description, reference being had to the accompanying drawings, forming a part of this specification, wherein—

Figure 1 is a view in elevation of our improved device, and Fig. 2 is a vertical sectional view of the same.

Referring to the drawings, the numeral 1 indicates a vessel of any suitable construction, said vessel preferably consisting of a metallic cylindrical retort contracted at one end, as at 2, and exteriorly screw-threaded, as at 3, and having screwed on said threaded end a cap 4. The lower contracted end 2 of the vessel has screwed in a threaded aperture 5, formed therein, an elbow 6, which has screwed upon its other end a coupling-sleeve 7, provided with an annular inwardly-projecting flange 8, that engages an annular collar 9, formed on one end of a pipe connection 10, the other end of said pipe connection being screwed in a threaded perforation 11, formed in one side of a steam-supply pipe 12. The steam-supply pipe 12 leads from the steam-generator (not shown) to the machinery to be actuated by the steam-pressure—such, for example, as the cylinder or cylinders of a steam-engine.

Arranged within the vessel 1 is a coiled pipe 13, the convolutions of which preferably lie in intimate contact with the interior of said vessel, and the lower end 14 of said coil passes through the elbow 6 and pipe connection 10 and at its free end projects centrally into the steam-supply pipe 12 in the direction in which the steam passes through the latter, as indicated by the numeral 15. The other end of said coil passes through an aperture 16, formed in the cap 4, and formed in said cap above said aperture is an annular recess 17, in which is fitted a packing 18, and screwed into said aperture is a pipe connection 19, which bears upon the packing 18 and compresses the latter in its seat about the end 16 of the said coil, thereby making a steam-tight connection between the coil and said pipe connection. Also formed in the cap 4 is a threaded aperture 20, into which is screwed one end of a pipe 21, the other end of which is connected by a coupling 22 to a pipe 23, that communicates with the steam-supply pipe 12, before referred to.

As shown, the pipe 23 is extended beyond the coupling 22 and is for the purpose of attachment to the lubricator.

The pipe connection 19 is connected to an oil tank or receptacle. (Not shown.)

The operation of our improved device is as follows: The steam-supply pipe 12 conducts the steam from the generator to the machinery to be actuated. For example, said pipe leads from the dome of a steam-boiler to a valve chest or chests of the cylinder or cylinders of a steam-engine. A portion of the live steam passes, by means of the pipes 23 and 21, into the vessel 1 and passes through and circulates around the steam-coil 13 and thence returns, by means of the elbow 6 and pipe connections 10, to the steam-pipe 12, the pipe forming the said coil being, as is clearly shown in Fig. 2, of less diameter than the elbow 6 and pipe connection 10, so that the steam would be permitted to escape freely from the vessel 1. The oil is fed by the pipe 19 to the said coil and in its passage through the latter is subjected to the full effects of the live steam and by the latter is wholly or partially vaporized, the extent of vaporization depending in a large degree upon the character of the oil employed as a lubricant.

The oil-vapors or the partially-vaporized particles of the oil are discharged by the end 15 of the coil centrally in the steam-supply pipe 12 and at such point are intimately commingled with the live steam and pass with the latter to the valve chest or chests of the engine and from the latter to the engine cylinder or cylinders and so applied in a heated condition to the working parts of said chest or chests and cylinder or cylinders, thereby thoroughly lubricating the same.

By curving the end 15 of the coil where it enters the steam-supply pipe in the manner shown said pipe partakes somewhat of the nature of an injector, and the steam passing through the pipe 12 operates to spray the vaporized or partially-vaporized lubricant centrally into the pipe, whereby an intimate admixture of the oily vapors or particles with the same is caused to take place, and such admixture is fed in this condition to the working parts of the machinery to be lubricated.

We have described, by way of example, our improved lubricant vaporizing and distributing device as being employed in connection with a steam-engine; but it will of course be apparent that the same may be employed in connection with machinery of any kind whatsoever that is actuated by steam-pressure.

Having described our invention, what we claim is—

1. The combination with a steam-supply pipe, of a vertical vessel communicating at its opposite ends with said steam-pipe, a spirally-coiled pipe arranged within said vessel, and means for feeding lubricant to the upper end of said coil, the lower end of the coil discharging by gravity into said steam-supply pipe, substantially as described.

2. The combination with a steam-supply pipe, a vessel connected at its opposite ends to said supply-pipe, a spirally-coiled pipe arranged within said vessel, the convolutions of said coil being disposed against the interior of the vessel, and means for feeding lubricant to one end of said coil, the other end of the coil draining into the steam-supply pipe, substantially as described.

3. In combination with a steam-supply pipe, of a vessel arranged in proximity to said pipe, pipe connections leading from said steam-supply pipe to one end of said vessel, pipe connections leading from the other end of the vessel to the steam-supply pipe, a pipe-coil disposed within said vessel, and means for feeding lubricant to one end of said coil, the other end of the coil being of less diameter than and passing through the pipe connections connecting one end of the vessel to the supply-pipe, substantially as described.

4. The combination with a steam-supply pipe, of a closed vessel arranged in proximity thereto, pipe connections leading from the steam-supply pipe into one end of said vessel, pipe connections leading from the other end of said vessel into the steam-supply pipe, a pipe-coil disposed in said vessel, means for supplying lubricant to one end of said coil, the other end of the coil being of less diameter than and passing through the steam-discharge-pipe connections into the steam-supply pipe, the discharge end of said coil being bent in the direction in which the steam passes through the steam-supply pipe, substantially as described.

5. The combination with a steam-supply pipe, of a vessel arranged in proximity thereto and consisting of a cylindrical metallic shell contracted at one end and provided at its other end with a threaded cap or cover, pipe connections leading from the steam-supply pipe through said cap or cover into the interior of the vessel, pipe connections leading from the contracted end of the vessel back into the supply-pipe, a coiled pipe disposed within said vessel and extending at one end through said cap or cover, and a lubricant-supply pipe connected to said end of the coil, the other end of said coil being of less diameter than and passing through the pipe connections connecting the lower end of the vessel to the steam-supply pipe, substantially as described.

In testimony whereof we have hereunto set our hands in presence of two subscribing witnesses.

WILLIAM P. MAINGAULT.
JOHN C. GRAHAM

Witnesses:
T. M. GALBREATH,
L. REID.